(12) United States Patent
Zlatsin et al.

(10) Patent No.: US 6,377,296 B1
(45) Date of Patent: Apr. 23, 2002

(54) VIRTUAL MAP SYSTEM AND METHOD FOR TRACKING OBJECTS

(75) Inventors: Alexander Zlatsin, Yorktown Heights; Dimitri Kanevsky, Ossining, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,845

(22) Filed: Jan. 28, 1999

(51) Int. Cl.[7] .................................................. H04N 7/18
(52) U.S. Cl. ...................................... 348/143; 704/260
(58) Field of Search ........................... 348/94, 116, 139, 348/143, 150, 151, 152, 153, 155, 159, 161, 169, 170; 382/103; 707/27, 8; 386/38, 39, 106, 96; 345/328, 520; 704/260, 270, 275; H04N 7/18

(56) References Cited

U.S. PATENT DOCUMENTS

| | | | |
|---|---|---|---|
| 4,009,331 A | * 2/1977 | Goldmark et al. | 386/38 |
| 4,395,740 A | * 7/1983 | Yuen et al. | 386/96 |
| 4,775,935 A | * 10/1988 | Yourick | 345/328 |
| 4,857,902 A | * 8/1989 | Naimark et al. | 345/167 |
| 4,905,094 A | * 2/1990 | Pocock et al. | 386/106 |
| 5,381,137 A | 1/1995 | Ghaem et al. | |
| 5,626,417 A | 5/1997 | McCavit | |
| 5,631,697 A | 5/1997 | Nishimura et al. | |
| 5,711,160 A | 1/1998 | Namisniak et al. | |
| 5,739,848 A | 4/1998 | Shimoura et al. | |
| 5,745,035 A | 4/1998 | Deyo | |
| 5,751,221 A | 5/1998 | Stanfield et al. | |
| 5,835,667 A | * 11/1998 | Wactlar et al. | 386/96 |
| 6,081,750 A | * 6/2000 | Hoffberg et al. | 345/520 |

OTHER PUBLICATIONS

"A Fully Automatic Approach to Facial Feature Detection and Tracking",pp. 77–84, Springer (1997).
"Real–Time Lip Tracking for Audio–Visual Speech Recognition Applications", by Robert Kaucic, Barney Dalton, and Andrew Blake, In Proc. European Conf. Computer Vision, pp. 376–387, 1996 Cambridge, UK.
"Search and Retrieval in Large Image Archives", by J. Turek, et al, RC–20214, IBM, (Oct. 2, 1995).

* cited by examiner

Primary Examiner—Vu Le
Assistant Examiner—Gims Philippe
(74) Attorney, Agent, or Firm—Ohlandt, Greeley, Ruggiero & Perle, LLP; Daniel P. Morris, Esq.; IBM Corporation

(57) ABSTRACT

A system, for automatically tracking objects, including a computer processor and memory, cameras and other sensors and a user interface. A user registers an object with the system by presenting the object to a camera, which produces an image of the object, and describing the object through a user interface. Based on an analysis of the image and the description provided by the user, an object identifier/tracker determines the attributes of the object, classifies the object according to the attributes, and indexes and stores the image in a database. The system will thereafter track the location of the object. Subsequently, the user can query the system to search the database to obtain information regarding the object.

14 Claims, 7 Drawing Sheets

VIRTUAL MAP SYSTEM AND METHOD FOR TRACKING OBJECTS

FIELD OF THE INVENTION

This invention relates to the tracking of objects, and more particularly to a system for detecting and identifying objects. The system determines attributes of the objects such as size, color and location, classifies the objects according to their attributes, and records the attributes to a database. Subsequently a user can request the system to search the database, and retrieve information about the object and its attributes.

BACKGROUND OF THE INVENTION

Even the most organized person occasionally misplaces something. A disorganized person may be faced daily with the task of locating his keys and wallet. A four year old child may borrow some of his mother's jewelry for show-and-tell. And finding that obscure and rarely seen widget might require an organized search from attic to basement.

A variety of systems have been developed to assist people in identifying, monitoring, tracking and/or locating objects in the home and office. Fairly common examples are key holders that respond to a clap of one's hands by emitting an audible signal, and portable telephones with a handset unit that rings when paged from the base unit. The prior art also offers some more elaborate computer-implemented techniques for tracking and managing items.

U.S. Pat. No. 5,711,160 describes a food tracking storage system. A base unit is mounted on or near a food storage location such as a refrigerator. When a food item is placed into the storage location, its name and storage lifetime are recorded on the base unit. Thereafter, the base unit provides signals indicating whether the food item has been stored beyond its useful lifetime.

U.S. Pat. No. 5,381,137 describes a system using radio frequency tags (RF tags) for identifying articles to which the tags are attached. A detection zone is radiated by a transmitter. Each tag contains a plurality of passive circuits that resonate at particular frequencies. When the tags are radiated, the system determines the resonant frequencies of each of the resonant circuits to uniquely identify the article to which the tag is attached.

U.S. Pat. No. 5,751,221 describes a system for tracking files located in file folders. Each file folder is equipped with a device that communicates with a processor via a bus. The file tracking system actively maintains and updates a database that includes file location.

One of the problems with these particular prior art systems is that some special device must be attached on or near each item that the systems are required to track. Attaching devices may be inconvenient in the sense that some manual intervention is required, or impractical where the item could not reasonably accommodate such an attachment.

In circumstances when the specific identity of an object is not important, or where the detection of motion in a confined area is sufficient to identify an object in that area, a system including one or more motion detectors may be employed. U.S. Pat. No. 5,745,035 describes a motion detecting system that alerts a user of motion being detected in various areas, and further indicates in which area the motion is being detected.

Where a system is responsible for tracking an item, the system must also provide a means for an interested user to obtain information about the item. In a case where many items are being tracked, such as in an inventory control system, information regarding the items is often organized and stored in a database. Sometimes the database can be easily searched, for instance, when the user knows the part number of an item of interest. In other cases a user may not have a precise identification of an item, or the user may wish to identify the item in terms of natural language, e.g. "Where are my eyeglasses?"

FIG. 2 is a flowchart of a search engine that allows a user to query a database using terms of natural language. Search engines of this type are commonly found on the Internet, and are employed to search databases of enormous size. The user presents a query including keywords that describe the item of interest. For example, a user considering a purchase of a car may query, "Find information about cars." In step 10, the keyword "car" would be parsed from the query. In step 12, an associator finds synonyms for the keyword. In this example, synonyms such as "automobile, and passenger vehicle" may be found. In step 14, the synonyms are classified to determine related parameters. Here, the query may be classified into categories such as "make, model, color, manufacturers, dealers, repairs, and parts." In step 16, the database is searched and an index is prepared of sites that may contain relevant information. Then, in step 18, the relevant information is retrieved from those sites.

Traditionally, keyboards have been used to enter descriptive data into databases, and to prepare queries for search engines. However, other technologies have been employed to enhance the user interfaces. For example, optical character recognition (OCR) and automatic handwriting recognition (AHR) are techniques whereby text can be recognized from documents, books or written notes. An automatic speech recognition (ASR) system accepts an input of spoken words and converts it into a text stream or some other code, based on the sound of the words. ASR systems are usually trained to recognize words by analyzing and profiling the voice of a speaker. Some systems can thereafter identify a voice as belonging to a particular individual. A semantic system is an extension of ASR, wherein spoken words are not merely recognized for their sounds, but the content and meaning of the spoken words is interpreted. That is, where ASR may recognize individual words, a semantic system is directed toward the interpretation of phrases and sentences.

A dialog system is a computer-implemented system for providing an interactive dialog between a person and a computer. The system interprets statements and questions presented by the person, and produces meaningful responses or follow-up questions. Such a system is described by U.S. patent application Ser. No. 09/78,807 for a Sleep Prevention Dialog Based Car System.

Systems have also been developed for acquiring images and interpreting movement. Cameras for acquiring images and converting the images to a digital format for use by a computer are well known in the art. U.S. patent application Ser. No. 09/183,482 for A System and Method for Digital Information Exchange improves upon a standard digital camera by including an embedded chip for Internet connectivity.

An object identifying/tracking system studies images to identify objects within the images and thereafter tracks the movement of the objects. Techniques for identifying and tracking objects are described in U.S. Pat. No. 5,631,697 for a Video Camera Capable of Automatic Target Tracking, and "Real-Time Lip Tracking for Audio-Visual Speech Recognition Applications", Proceedings of European Conference of Computer Vision, published by Cambridge UK (1966).

A gesture recognition system accepts input from a user based on the user's movements, such as hand gestures. That is, the user communicates with the system in a manner similar to a sign language. U.S. patent application Ser. No. 09/79,754 for Apparatus and Methods for User Recognition Employing Behavioral Passwords describes a gesture recognition system.

A computer's ability to recognize specific sounds and objects has led to the development of systems that can recognize a specific user based on the user's voice and/or face. The following references describe techniques of user recognition. U.S. patent application Ser. No. 08/788,471 for Text-Independent Speaker Recognition For Command Disambiguity And Continuous Access Control. Sobotka, "Fully Automatic Approach To Facial Feature Detection And Tracking", pp. 77–84, Springer (1997).

Data in text format can be indexed, archived and searched by using keywords that are typically included in the data itself. For example, a search for the word "eyeglasses" is performed by searching for the string of text "eyeglasses". However, systems dealing with the storage and retrieval of graphic or audio data are confronted with challenges not found when managing textual databases. A search for an image of a pair of eyeglasses cannot be performed by searching for the string of text "eyeglasses", because the image doesn't contain a string of text. Systems for searching graphic databases work on the principal of identifying shapes of objects within images in the databases. Systems for searching audio databases identify specific audio components such as spectral density or voice prints. The following references describe several methods for indexing, archiving and searching graphic and audio databases. U.S. Pat. No. 5,739,848 for Object Recognition Apparatus and Method. U.S. patent application Ser. No. 09/63,805 for Random Visual Patterns Used to Obtain Secured Access. U.S. patent application Ser. No. 09/108,544 for an Audio/Video Archive System and Method for Automatic Indexing and Searching. J. Turek et al., "Search and Retrieval in Large Image Archives", RC-20214, IBM, (Oct. 2, 1995).

Accordingly, a first object of the present invention is to provide an object tracking system and method that does not require any special devices to be attached to objects that are being tracked, but instead, monitors the objects with cameras and other sensors.

A second object of the present invention is to provide an object tracking system and method that utilizes object identifying technology to analyze pictorial images of objects and to automatically track the objects.

A third object of the present invention is to provide an object tracking system and method that utilizes user interface technologies including, automatic handwriting recognition, automatic speech recognition, gesture recognition, semantic processing and interactive dialog processing.

A fourth object of the present invention is to provide an object tracking system and method that utilizes search/retrieval technologies for classifying, indexing, archiving various attributes of objects registered with the system, wherein the data representing the attributes can be in the form of text, audio, or pictorial images.

A fifth object of the present invention is to provide an object tracking system and method that utilizes cameras and sensors that include computer network and Internet connectivity.

SUMMARY OF THE INVENTION

A system and method for automatically tracking objects, includes a computer processor and memory, cameras, other sensors and a user interface. A user registers an object with the system by presenting the object to a camera, which produces an image of the object, and describing the object through a user interface. Based on an analysis of the image and the description provided by the user, an object identifier/tracker determines attributes of the object, classifies the object according to the attributes, and indexes and stores the image in a database. The system will thereafter track the location of the object. Subsequently, the user can query the system to search the database to obtain information regarding the object.

DETAILED DESCRIPTION OF THE INVENTION

Figure 1:
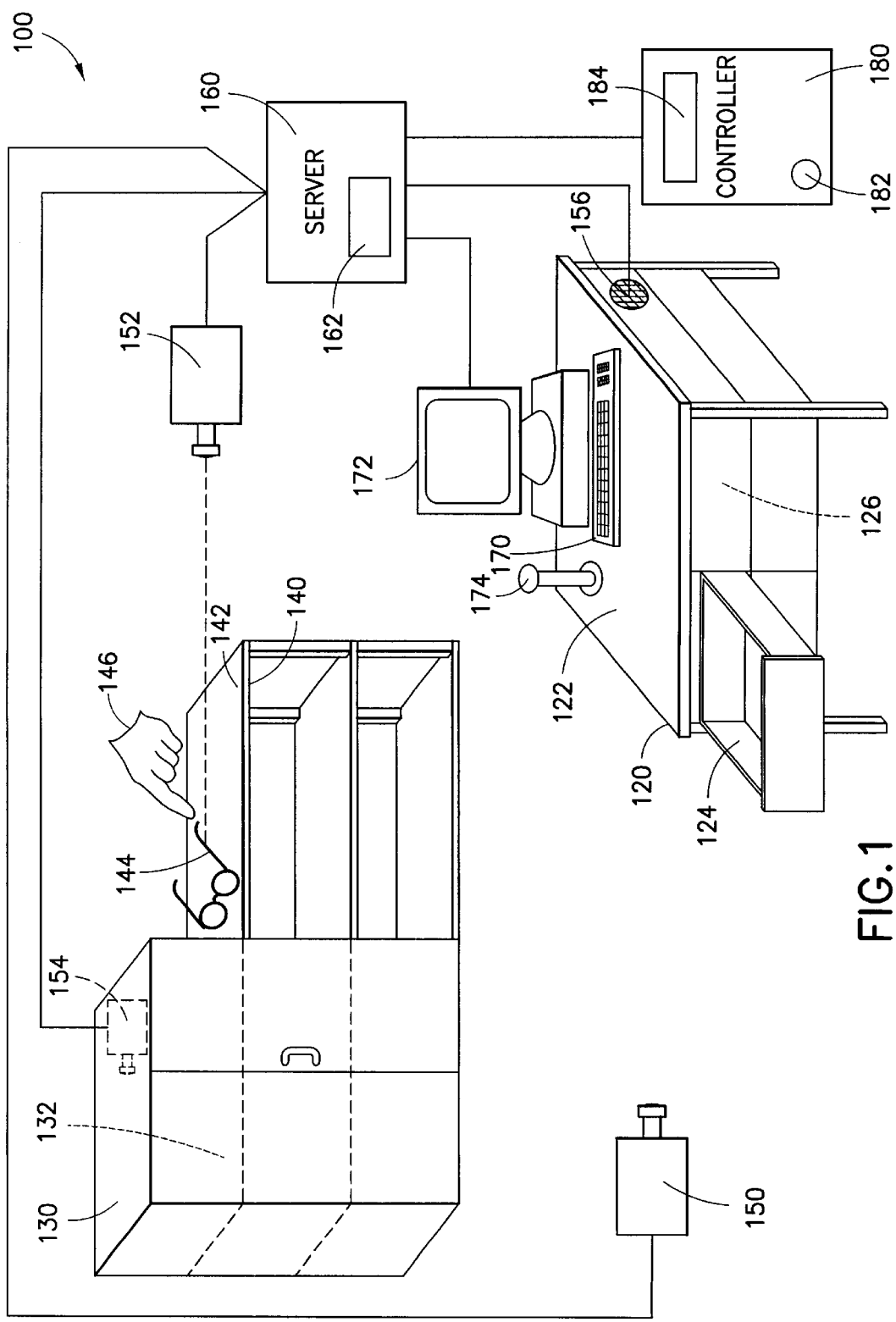
FIG. 1 is a diagram of a room showing an application of the object tracking system of the present invention.
Figure 2:
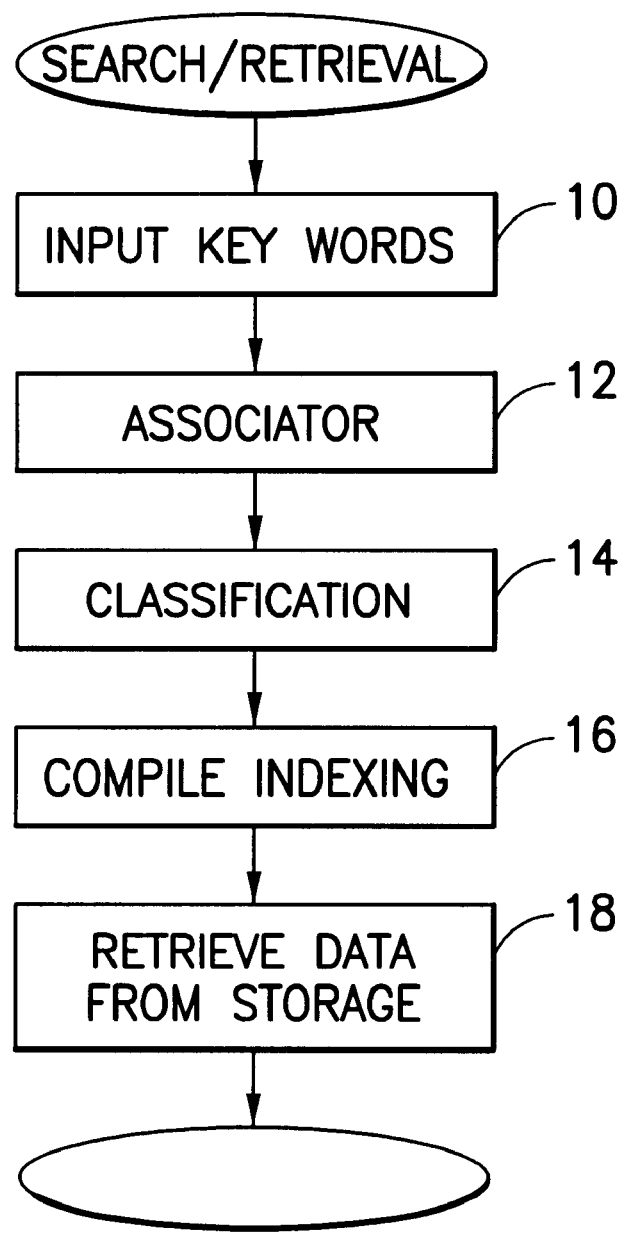
FIG. 2 is a flowchart of a prior art search engine.

FIG. 1 illustrates a basic application of the object tracking system of the present invention. A room 100 includes several pieces of furniture, each having areas where objects can be located. A desk 120, has a desktop 122, and drawers 124 and 126. Cabinet 130 has a cabinet interior 132. Shelf 140 has a top shelf 142 upon which is located a pair of eyeglasses 144. Cameras 150 and 152 are positioned to monitor room 100. A night-vision camera 154 monitors cabinet interior 132, and a motion detector 156 monitors drawer 126.

Eyeglasses 144 are being monitored by camera 152. A user (not shown) makes a hand gesture 146 such as extending five fingers and then extending an index finger, touches eyeglasses 144 and announces, "These are my eyeglasses." Camera 152 produces an image of eyeglasses 144 and hand gesture 146, and microphone 174 senses the phrase "These are my eyeglasses." Both the image and the phrase are reported to a computer-based server 160. As will be described in detail below, server 160 analyzes the image of eyeglasses 144 and hand gesture 146, together with the phrase "These are my eyeglasses". Server 160 identifies eyeglasses 144 as "eyeglasses", and further recognizes attributes of eyeglasses 144 such as shape, size, color and location. Thereafter, the image and attributes of eyeglasses 144 are stored into a database 162.

Subsequently, via a keyboard 170 or by speaking into microphone 174, the user can query, "Where are my glasses?". Server 160 will analyze the query, search database 162 and report the location of eyeglasses 144 on display 172. Alternatively, the user can make the query by using a hand-held controller 180, which includes a microphone 182, whereas the report will be presented on a display 184.

Figure 3:
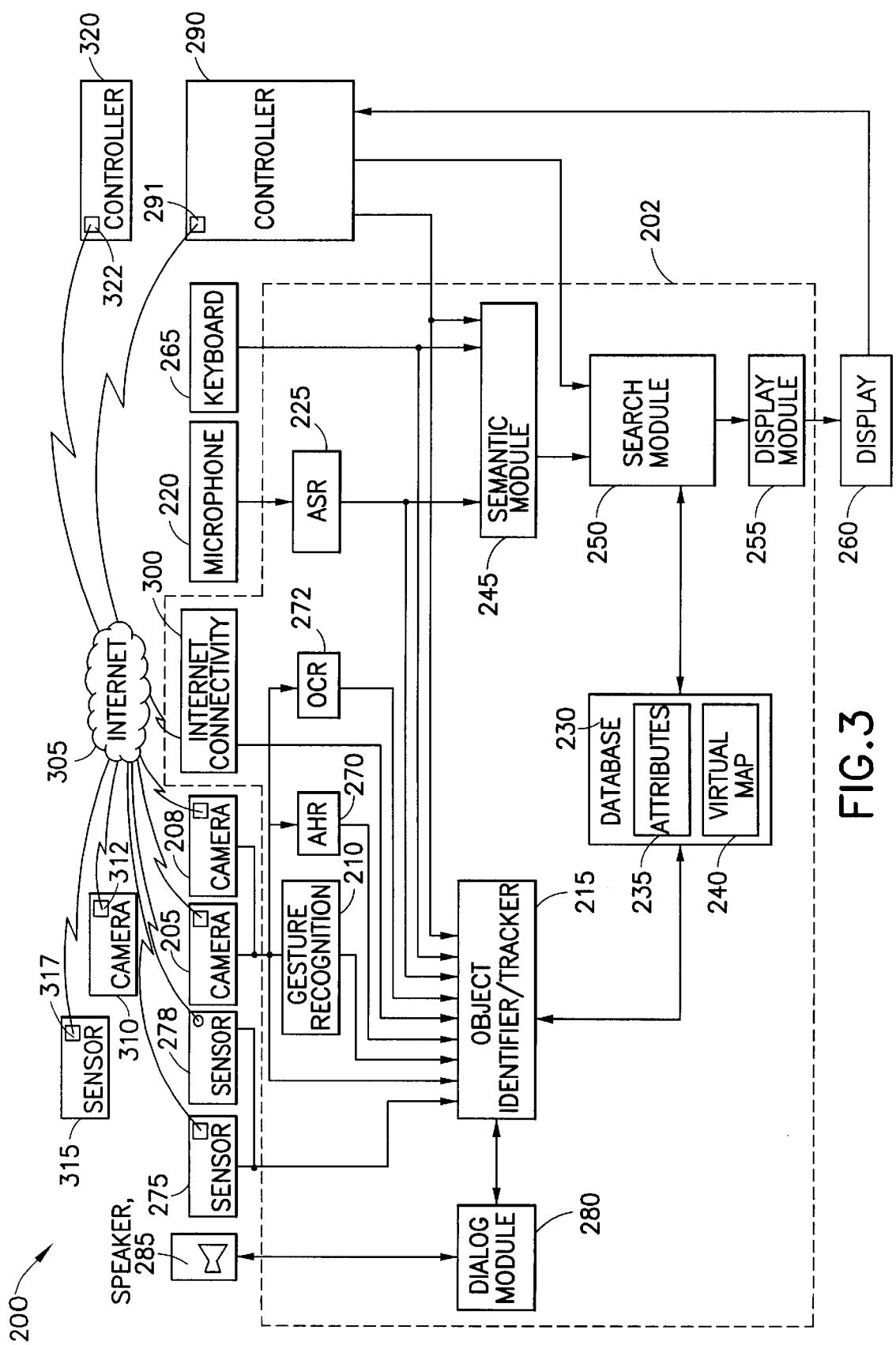
FIG. 3 is a block diagram of the object tracking system of the present invention.

FIG. 3 is a block diagram of an object tracking system 200 according to the present invention in its preferred embodiment. In this diagram, a dotted line 202 encloses the components of the server. The operation of the system will again be described using the example where a user (not shown) wishes to register a pair of eyeglasses (not shown) with the system.

A plurality of cameras 205 and 208 monitor a space (not shown) within which the eyeglasses are located, and produce an image of the eyeglasses. The user acquires the attention of the system and puts it into an object registration mode by making a unique gesture, then touches the eyeglasses and makes a statement such as, "These are my eyeglasses." A gesture recognition module 210 interprets the gesture and alerts object identifier/tracker 215 that an object is about to be registered. The user's statement is received through microphone 220 and is interpreted by automatic speech recognition (ASR) module 225. Object identifier/tracker 215 analyzes the image of the object with regard to parameters such as shape, size, color and location, and labels the object as "eyeglasses." Thereafter, the image is stored in database 230 where it is indexed according to its attributes 235. The location of the object is also represented in virtual map 240.

Cameras 205 and 208 will continue to monitor the space within which the eyeglasses are located. Since the eyeglasses have been registered with the system, object identifier/tracker 215 will analyze any motion reported by cameras 205 or 208 in the vicinity of the eyeglasses. If the eyeglasses are moved, object identifier/tracker 215 will track the eyeglasses and automatically update database 230 to show the new location of the eyeglasses.

Subsequently, the user can query the system with a statement such as, "Where are my glasses?" The statement is detected by microphone 220, interpreted by ASR module 225, and passed to a semantic module 245, which analyzes the user's request and prepares a query for search module 250. In this example semantic module 245 would be responsible for recognizing that the question, "Where are my glasses?" seeks the same information as the command, "Find my eyeglasses."

Search module 250 searches database 230 and retrieves data, which in this example includes the image and location of the eyeglasses and the virtual map of the area within which the eyeglasses are located. The results of the search are passed to display module 255, which processes the data to provide a video output to display 260. After the image and the virtual map are displayed, the user can issue commands such as MOVE LEFT, MOVE RIGHT, MOVE UP, MOVE DOWN, ZOOM IN, and ZOOM OUT to navigate the displayed virtual map, and the frame of reference of the display will be accordingly modified.

As with most computer applications, a user can enter data and commands via a keyboard 265. However, the preferred embodiment is envisioned to include several additional modes of user interface.

Automatic handwriting recognition (AHR) module 270 is included to capture the text from handwritten notes and optical character recognition (OCR) module 272 captures text from printed documents and books. For example, if the user registers a math book with object tracking system 200 by using the phrase "This is my book", cameras 205 or 208 can scan the book's cover and the title "Linear Algebra" can be analyzed by OCR module 272, thus providing an additional descriptor for the object.

Figure 4:
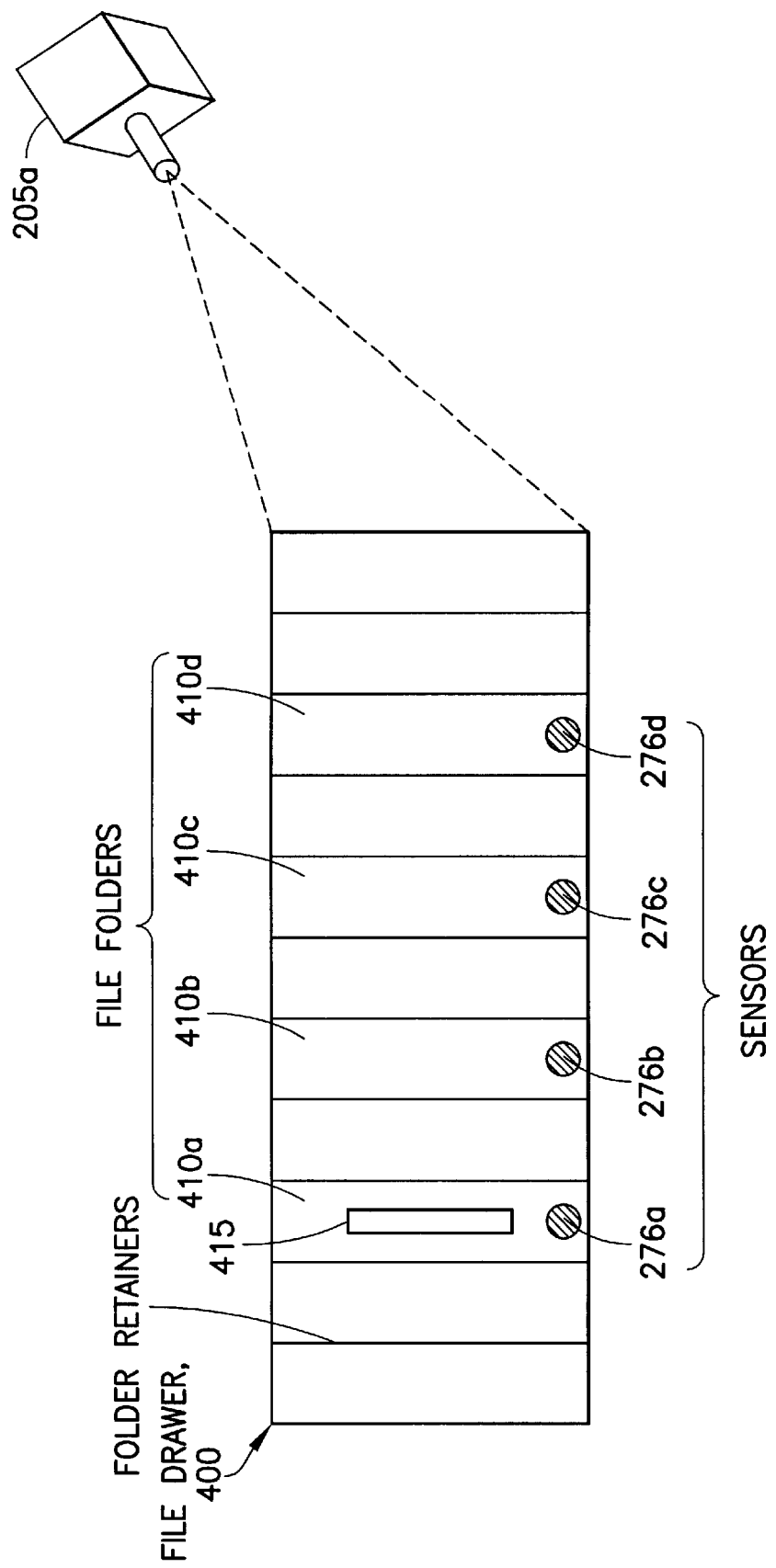
FIG. 4 is a diagram of a file drawer including file folders with position sensors.

A plurality of sensors 275 and 278 may be included where the user desires to track an object's location at a resolution greater than that which can be achieved by a camera alone. FIG. 4 illustrates an example where position sensors 276a–276d are situated in individual file folders 410a–410d, respectively, within a file drawer 400. Although a camera 205a has a view of file drawer 400, camera 205a cannot identify the specific file folder 410a–410d into which document 415 has been placed. However, position sensor 276a indicates activity in file folder 410a. Therefore object tracking system 200 can conclude that document 415 was placed into file folder 410a. In another application, a motion detector can serve as a trigger to alert object identifier/tracker 215 of activity in a region of a particular camera so that object tracking system 200 can focus its attention on that region.

Returning to FIG. 3, a dialog module 280, in cooperation with a speaker 285, provides a means for object tracking system 200 to engage in an interactive conversation with the user. For example, dialog module 280 can request the user to (a) rotate an object or (b) provide other descriptive information, to assist object identifier/tracker 215 to more accurately identify or classify the attributes of the object under consideration. This feature is particularly useful for cases where object identifier/tracker 215 is attempting to distinguish a new object from similar objects in database 230, or when objects are inherently similar as pens are similar to pencils. The system may also solicit information from a user regarding an object that the system is tracking.

Figure 5:
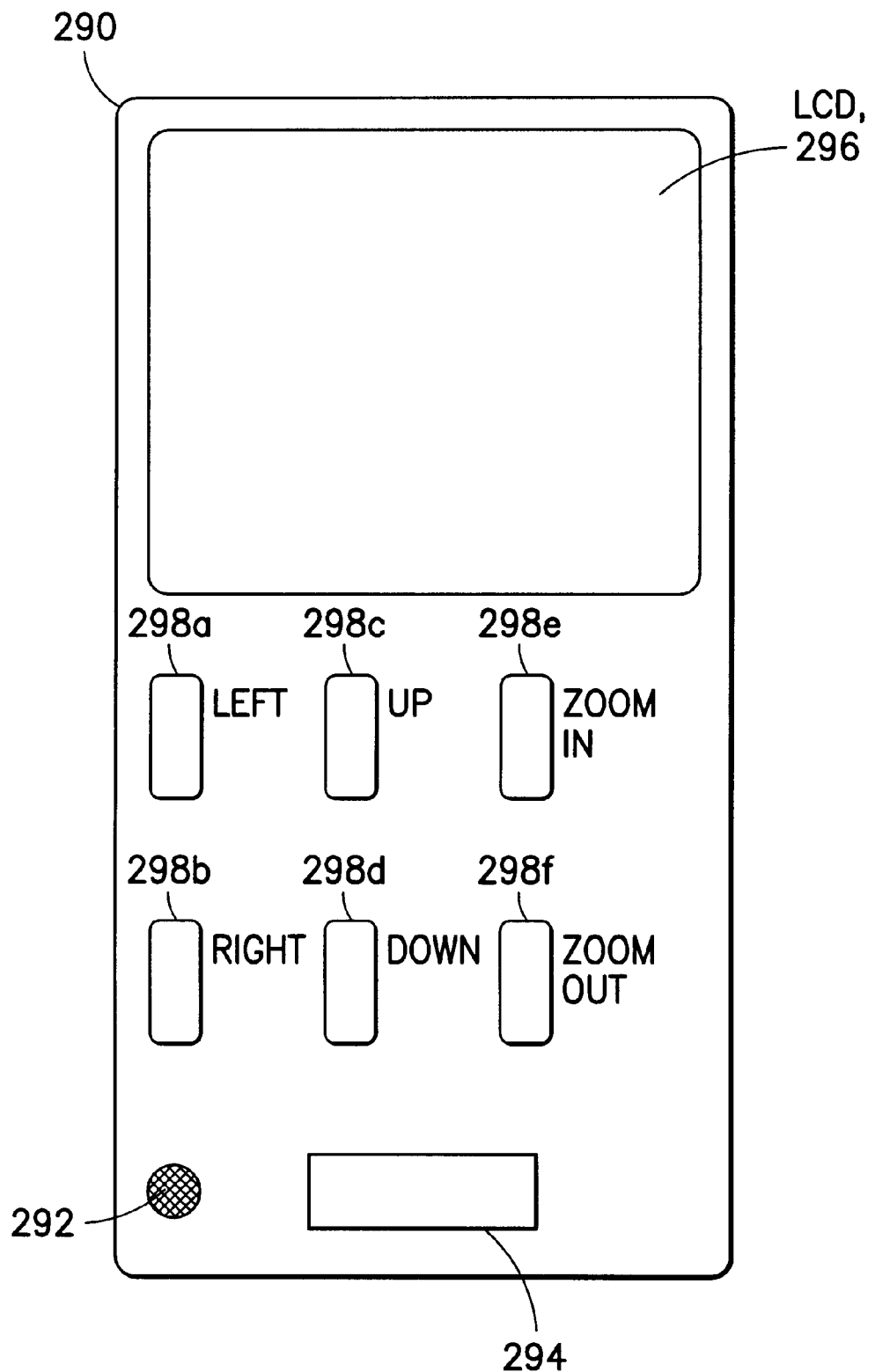
FIG. 5 is a diagram of a hand-held controller of the present invention.

A hand-held controller 290 provides a wireless connection, which may be via an embedded chip for Internet connectivity 291, whereby the user can communicate with object tracking system 200. FIG. 5 is a diagram of hand-held controller 290 showing that it includes a microphone 292 through which the user can verbally enter descriptive parameters, commands and requests, and a speaker 294 through which dialog module 280 can communicate to the user. The results of a search will be displayed on a liquid quartz display (LCD) 296. Controller 290 also includes navigation buttons for modifying the frame of reference of LCD 296 to MOVE LEFT 298a, MOVE RIGHT 298b, MOVE UP 298c, MOVE DOWN 298d, ZOOM IN 298e and ZOOM OUT 298f.

Referring again to FIG. 3. Object tracking system 200 is not physically confined to one room or one building, as it can be coupled to remote devices through a computer network. Through an Internet connectivity module 300 and Internet 305, remote devices such as a camera 310 and a sensor 315 can be accessed to provide information concerning objects at remote locations. Likewise, a user at a remote site can access the system via a controller 320. Note that Internet access is accomplished by way of an embedded chip in each of these devices. That is, camera 310 includes embedded chip 312, sensor 315 includes embedded chip 317, and controller 320 includes embedded chip 322. In the general case, each of the various cameras 205 and 208, sensors 275 and 278, and controller 290 include an embedded chip for Internet connectivity. Furthermore, Internet access can be achieved through wireless connections such as that provided by cellular telephone service. This feature broadens the reach of object tracking system 200 so that it may monitor automobiles and other non-stationary vessels.

Figure 6:
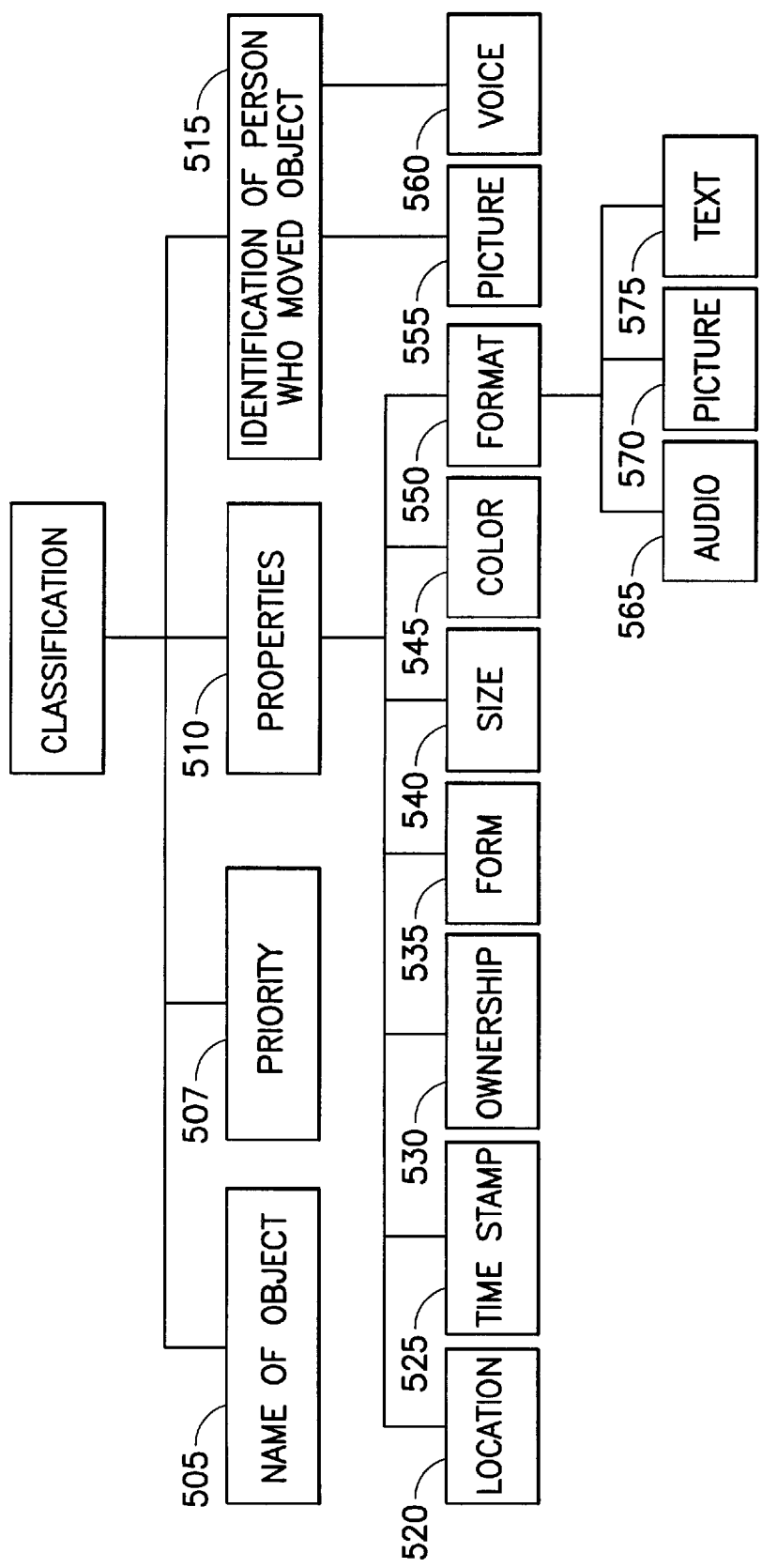
FIG. 6 is a block diagram of a classification structure for organizing attributes of registered objects.

FIG. 6 is a block diagram showing an example of a classification structure for objects that have been registered with the object tracking system. An object can be assigned a name 505, and a priority 507 based on a description provided by the user. Priority 507 designates a level of importance to an object, for instance, jewelry may have a higher level of importance than a toy. Accordingly, the system can search for objects based on priority.

Object properties 510 will typically include a location 520, a time stamp 525 indicating the time at which the object was registered or moved, an ownership 530 of the object, and physical descriptors such as a form 535 (e.g. round, square, rectangular), a size 540, and a color 545. Relevant data can be stored in several formats 550 such as an audio clip 565, a picture 570 or a text 575.

Classification categories can be extended to provide information regarding the identification of the person who moved the object 515, including that persons picture 555 and a voice print 560. Note that by including time stamp 525 and identification of person who moved the object 515, the user can make requests such as, "Show me the last time my glasses were moved" and "Who moved my glasses?".

Figure 7:
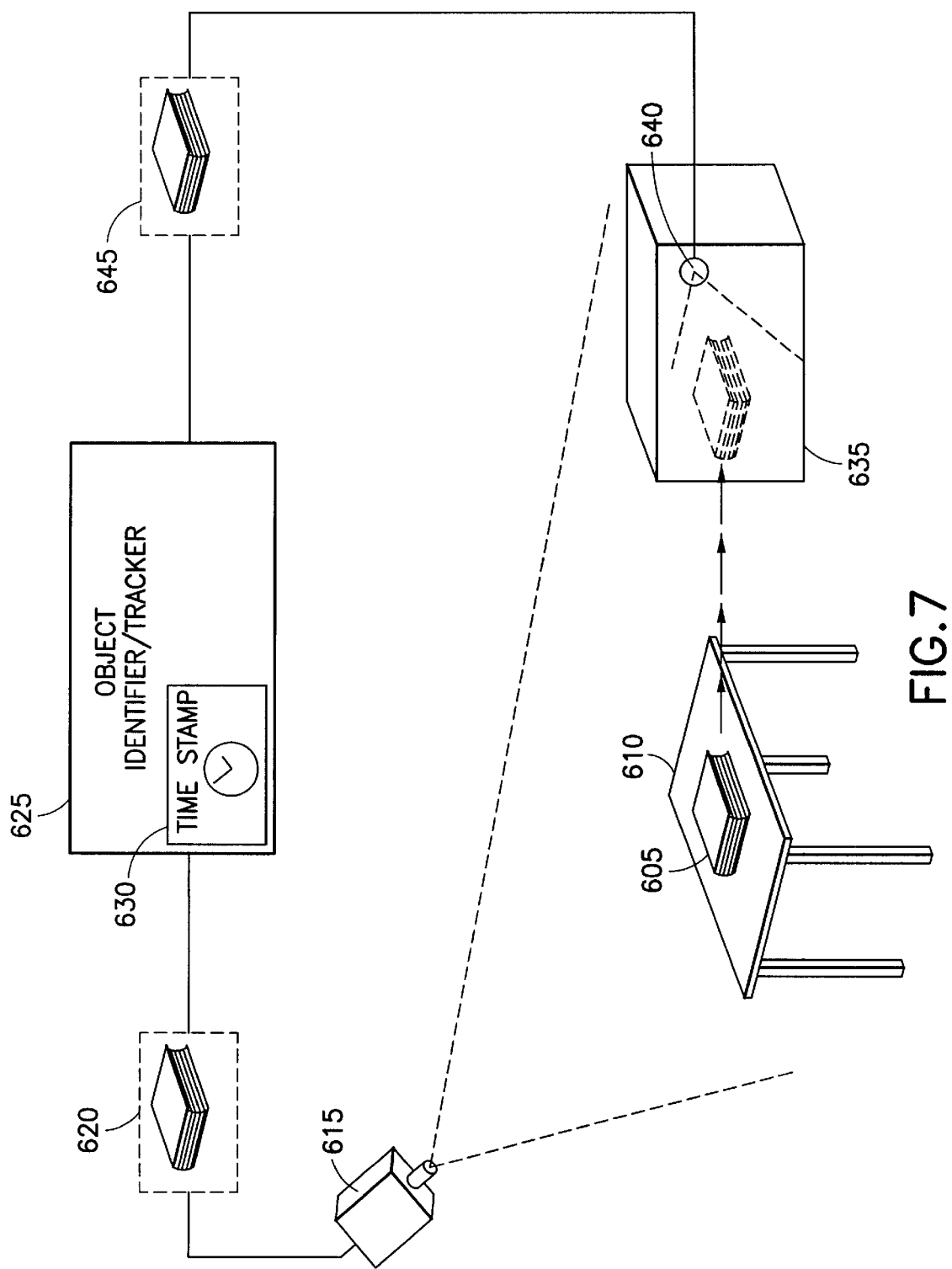
FIG. 7 is a diagram illustrating a technique of tracking an object as the object is moved from a field of view of a first camera to a field of view of a second camera.

FIG. 7 illustrates a technique of tracking an object as the object is moved from a field of view of a first camera to a field of view of a second camera. Assume a book 605 has previously been registered with the object tracking system. While book 605 is located on a table 610, a first camera 615 monitors book 605 and produces a first image 620 for analysis by an object identifier/tracker 625, which identifies book 605 and logs its location at a time given by time stamp 630. As book 605 is moved into a drawer 635, there will come a point at which a second camera 640 will produce a second image 645. Object identifier/tracker 625 will also analyze second image 645 to identify book 605 and log its location at a time given by time stamp 630. By comparing the location and time stamp associated with first image 620 to that of second image 645, object identifier/tracker 625 can conclude that the two separate images 620 and 645 are different views of a single book 605.

The object tracking system of the present invention is a novel combination of interactive processing technologies that can be applied in a variety of daily situations. It should be understood that various alternatives and modifications can be devised by those skilled in the art without departing from the invention. For example, since the object tracking system includes ASR and a semantic module with voice recognition capabilities, the system could assign attributes based on the identification of a particular speaker. That is, if the system is familiar with the voice of a user named Jack, then when Jack says, "These are my eyeglasses", the system can identify the eyeglasses as specifically belonging to Jack. Also, people as well as inanimate items can qualify as objects, therefore the object tracking system could be used to track people. In a large office or a complex of several buildings, the system could be used to locate employees or coworkers. Accordingly, the present invention is intended to embrace all such alternatives, modifications and variances that fall within the scope of the appended claims.

We claim:

1. A system for tracking an item, comprising:
    a camera for monitoring a space within which said item is located, and for producing an image of said item;
    object identifier/tracker means, for (a) receiving said image, (b) registering said item and logging a location of said item in said space, and (c) updating said logged location if said location in said space changes;
    database means, coupled to said object identifier/tracker means, for storing data representative of said item and said logged location;
    user interface means for (a) accepting a descriptor of said item, wherein said descriptor is used by said object identifier/tracker means when registering said item, and (b) accepting a request regarding said item;
    a search means for formulating and passing a query to said database means based on said request, and for retrieving a result from said database means, said result indicating said logged location of said item; and
    output means for reporting said result.

2. The system of claim 1, further comprising a gesture recognition means, coupled to said camera, for monitoring and interpreting a gesture of a user, and, based on said gesture, providing a directive to said object identifier/tracker means initiating said registration of said item.

3. The system of claim 1, further comprising one or more sensors, coupled to said object identifier/tracker means, for indicating motion of an object in a subset of said space.

4. The system of claim 1, wherein said object identifier/tracker means classifies one or more attributes of said item selected from the group consisting of name, priority, color, form, size, time stamp, and ownership.

5. The system of claim 4, wherein said data representative of said attributes is stored in one or more formats selected from the group consisting of text, picture, and audio.

6. The system of claim 1, wherein said user interface means includes at least one of a keyboard, a handwriting recognition module, an optical character recognition module and a speech recognition module.

7. The system of claim 6, further comprising a semantic module coupled to said speech recognition means, for analyzing a spoken phrase to assist said search means when formulating said query.

8. The system of claim 7,
    wherein said semantic module recognizes a voice as that of a particular individual, and
    wherein said object identifier/tracker means associates said item with said particular individual.

9. The system of claim 1, further comprising a speaker means for communicating audible sounds to a user, and a dialog module for engaging in a spoken dialog with said user.

10. The system of claim 1, wherein said database means further comprises a virtual map of said space, and said output means comprises a display means for displaying an image of said item represented at said logged location on said virtual map.

11. The system of claim 10, wherein said user interface means further comprises a navigation means for modifying said displayed image, including the ability to cause said displayed image to move left, move right, move up, move down, zoom in and zoom out.

12. The system of claim 1, wherein said database means further comprises a virtual map of said space, and said user interface means comprises a controller means, said controller means comprising:
    a speech recognition module for accepting a spoken phrase from a user;
    speaker means for communicating audible sounds to said user;
    display means for displaying an image of said item represented at said logged location on said virtual map;
    navigation means for modifying said displayed image, including the ability to cause said displayed image to move left, move right, move up, move down, zoom in and zoom out.

13. The system of claim 1, further comprising:
    means for connecting to a computer network,
    wherein said camera further comprises means for connecting to said computer network for remote communication with said system, and
    wherein said user interface means further comprises means for connecting to said computer network for remote communication with said system.

14. A computer-implemented method for tracking an item, said method comprising the steps of:

monitoring a space within which said item is located and producing a first image of said item;

acquiring a descriptor of said item;

registering said item and logging a location of said item in said space based on said first image and said descriptor;

storing data representative of said item and said logged location to a storage media;

monitoring said item and producing a second image of said item;

identifying said location of said item based on said second image;

updating said stored data representative of said logged location in a case where said location changes;

accepting a request regarding said item;

searching said storage media based on said request and retrieving said data representative of said logged location; and reporting a result of said search.

* * * * *